Figure 5:
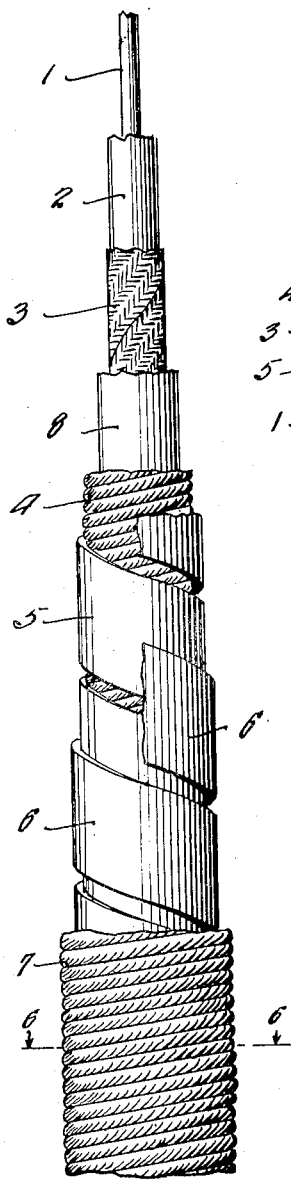

Jan. 23, 1934.  C. P. BRODHUN  1,944,634
CABLE
Original Filed May 5, 1927   2 Sheets-Sheet 1
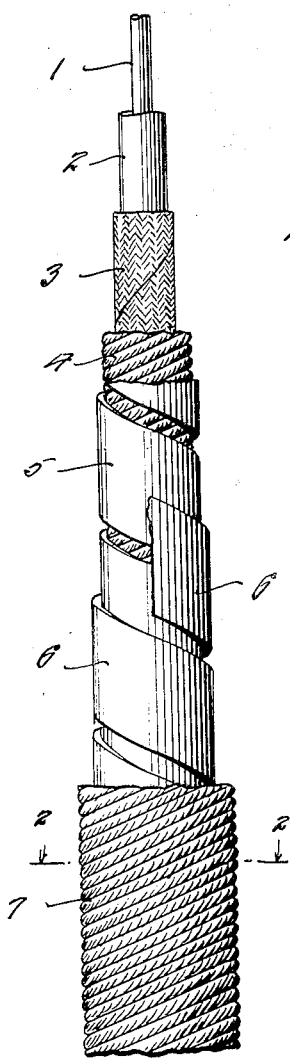
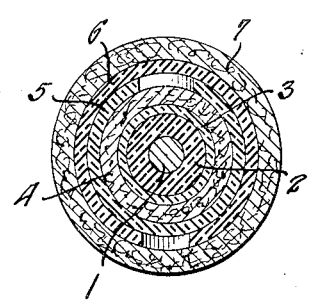
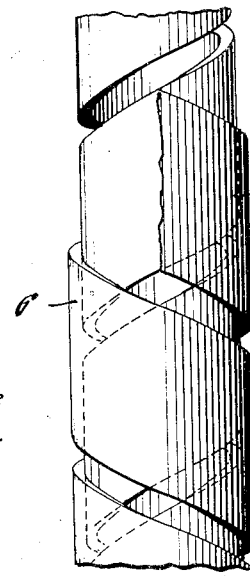
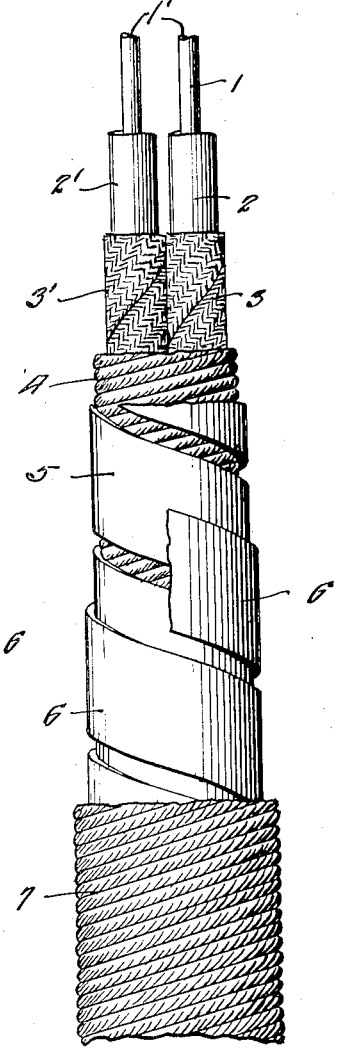
Inventor
CARL P. BRODHUN
By
Attorneys Jan. 23, 1934. C. P. BRODHUN 1,944,634
CABLE
Original Filed May 5, 1927 2 Sheets-Sheet 2

Inventor
CARL P. BRODHUN

By

Attorneys

Patented Jan. 23, 1934

1,944,634

UNITED STATES PATENT OFFICE 1,944,634

CABLE

Carl P. Brodhun, Wilkes-Barre, Pa.

Application May 5, 1927, Serial No. 189,117
Renewed September 8, 1932

3 Claims. (Cl. 173—267)

This invention relates in general to cables and more particularly has reference to insulated electric cables.

The insulation of cables of this character in the past has been attended with the problem of providing a protective covering for the cable, either as a part of the body or a separate casing that will efficiently resist the deleterious effects of the elements. This problem is encountered primarily in the insulation of submarine and subterranean cables, though it is met to some degree in aerial cables as well.

As a solution of the problem, cables of this type have been encased in terra cotta, wood and metal conduits or have been provided with protective sheathing of resilient fibrous or metallic material, or a combination of one or more of these.

In those instances where conduits have been employed to enclose the cables, the expense involved has been exceedingly great, due to both the cost of the conduits and the wages of skilled labor required to install them. They have also been attended by certain disadvantages, in that, if a conduit is laid through a crowded section, it is necessary to suspend activity while the roadway is torn up and repaved.

The cables installed without conduits, have given rise to certain difficulties that have never heretofore been surmounted. The generally accepted practice has been to encase the conductor and insulation previously applied, with a continuous sheath of lead or other metal and further enclose the whole with one or two layers of spirally wrapped band steel or other metal or metals, a sheathing of fabric wound under and over the metallic wrapping for cushioning purposes.

This invention consists in general of the provision of an electric cable intended for subterranean use but adaptable as well for submarine and aerial installation, having a protective covering that will effectively resist the deleterious effects of weathering and protect the insulated electrical conductor from mechanical injury.

It further consists in the provision of an electric cable dispensing with the customary metallic protective sheathing and windings without losing its ability to withstand natural or mechanical injury.

An object of this invention is to provide an electric cable having an outer protective covering that will effectively resist weathering.

Another object of this invention is to provide an electric cable having protective sheathing that will effectively resist mechanical injury.

Yet another object of this invention is to provide an electric cable having pliant and flexible outer protective coverings.

Still another object of this invention is to provide an electric cable having outer protective covering that may be easily repaired.

A further object of this invention is to provide an electric cable with protective covering which has no impedance effect on the circuit in which the conductor is located.

A still further object of this invention is to provide an electric cable dispensing with the customary metallic sheathing without seriously impairing its ability to withstand natural and mechanical injuries.

Yet a further object of this invention is to provide an electric cable dispensing with the customary metallic sheathing having an outer covering that will effectively resist the deleterious effects of weathering.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

Figure 6:
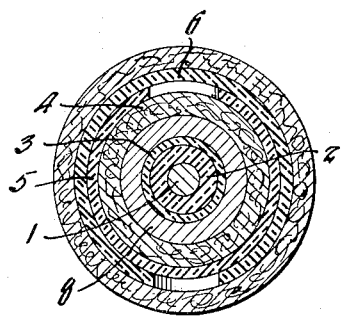
Figure 7:
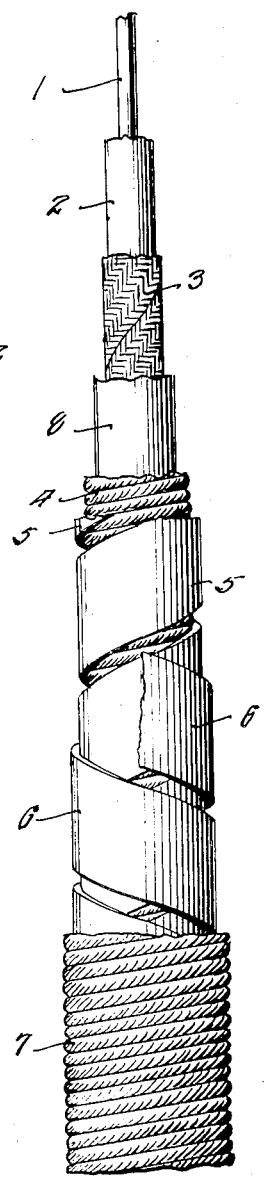

In the drawings forming a part of this specification:

In Figure 1 is shown a side elevational view of the improved cable forming the subject matter of this invention;

In Fig. 2 is shown a top plan view taken on line 2—2 of Fig. 1;

In Fig. 3 is shown a side elevational view of a modification of Fig. 1;

In Fig. 4 is shown a side elevational view of a modification of Fig. 1;

In Fig. 5 is shown a side elevational view of a modification of Fig. 1;

In Fig. 6 is shown a top plan view taken on line 6—6 of Fig. 5;

In Fig. 7 is shown a side elevational view of a modification of Fig. 5;

Referring by numerals to the drawings wherein the same and similar elements are designated by like symbols of reference throughout, and more particularly to Fig. 1, 1 is representative of an electric conductor composed of any suitable highly conductive material, generally copper. The conductor is encased in insulation 2 composed of rubber, paper, cambric or other commonly used insulating material. Over the insulation a spirally wrapped insulating tape, or impregnated braid 3 is applied, though this is not an essential element of the invention.

Around the insulation or tape or braid there is wound a layer of jute or other cushioning or protecting material 4, thoroughly waterproofed by saturation with an asphaltum compound, paraffin or any other desirable suitable substance or compound.

At this point there is applied two layers of non-metallic protective strips 5 and 6, adapted to further protect the cable. These strips are helically wound, the outer strip being adapted to be wound in staggered relation to the inner strip so as to cover the spaced adjacent helical edges of the inner strip.

Another form of winding is shown in Figure 3 wherein the non-metallic strips 5 and 6 are helically wound in crisscross relation. For certain purposes this type of winding affords greater rigidity to prevent looping of the cable as it precludes both lateral and rotational bights while the helical winding offers safeguard only against lateral bights. Over this winding is adapted to be wound a layer of jute or other fiber 7 thoroughly saturated with asphaltum compound, paraffin or any other suitable substance or compound. This covering is designed to lend pliancy and flexibility to the cable thus excluding fractures or cracking in the outer surface and preventing the inner protective covering from becoming exposed.

As shown in Fig. 4 the covering heretofore specified may be applied over a plurality of conductors 1 and 1', in the same manner as over a single conductor.

If it be so desired an additional sheathing may be added of an integral metallic nature to the protective covering as shown in Fig. 5, wherein a metallic sheath 8 is imposed over the fabric winding 3, having wound thereover the jute covering 4. The protective windings 5 and 6 may be helically wound in either staggered relation or crisscross relation as shown in Fig. 7.

The use of this type of protective coverings instead of steel bands is adapted to reduce the weight of the cable and remove the likelihood of current losses, without materially affecting the cable's abilty to withstand mechancal or natural injury. Over the integral metallic sheath 8 is wound the treated jute or other fiber 4 in a manner heretofore described. This material from which the layers 5 and 6 are formed may be of a fabric or of a fibrous nature and possessing a sufficient degree of resistance to mechanical stresses to afford ample protection to the enclosed insulated electric conductor, and treated with any suitable composition to render it entirely waterproof. These may be either helically wound as previously explained in staggered relation, or the second tape so applied as to cover the openings in adjacent convolutions of the first tape in crisscross relation. The completed cable may be treated with powdered chalk, soap stone or any similar substance to prevent adhesion.

It must be borne in mind that the strips 5 and 6 must be strong and stiff enough to protect the conductor from injury, such as a glancing blow of a pick or other instrument used in connection with placing the cable in position. I do not wish to be specifically limited to a particular type of material to accomplish this purpose, but there are certain materials which I have used and which I find to have admirable properties for the purpose which I have in mind.

The layers 5 and 6 may be formed of a heavy treated duck, which is treated with varnish and the varnish then baked in. This gives a pliable construction, non-inductive and non-magnetic, yet of sufficient hardness and toughness to serve the purpose of a protecting layer serving the functions herein specified.

Another type of material which has proven useful for the purpose designated is that type of composition which may be designated by the broad generic term of "fabricoid material". By this I mean such materials as are used for automobile tops. This material can be made of sufficient stiffness to serve the purpose and is non-magnetic and non-inductive in its action.

Other materials which have proved advantageous are vulcanized fiber and certain of the phenolic condensation products, such as "bakelite". It is necessary that these phenolic condensation products not have the maximum degree of stiffness, since they may be so stiff as to be brittle, and this is of course a property which must be avoided in selection of the material for the purpose of these protective wrappings 5 and 6. Another type of material which may be used is that material known on the market as "Micarta". This is a composite material formed of layers of heavy duck or canvas impregnated with a phenolic condensation product such as "bakelite". As above pointed out, the impregnating phenolic condensation product used must be in such condition as to avoid the degree of hardness which would impart to it an undesirable brittleness. Also certain paper and fibrous wrappings specially treated to give them toughness and make them waterproof may be employed.

I accomplish by this invention an improved electric subterranean cable, adaptable to submarine and aerial use as well, provided with a pliant and flexible outer waterproof covering made to afford ample protection against mechanical injury as well as the deleterious effect of weathering.

There is further accomplished an electric cable dispensing with the customary metallic coverings having a pliant and flexible outer waterproof covering precluding magnetic induction, or transformer loops, and serving the double purpose of a safeguard against mechanical injury and the deleterious effects of weathering.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. An electric cable comprising a conductor, a resilient insulation around the conductor, an impregnated fabric sheath around the resilient insulation, an impregnated fibrous wrapping around the fabric sheath, a plurality of strips of stiff bendable non-magnetic, non-conducting material helically wound around the impregnated fibrous wrapping, and an impregnated fibrous wrapping around the helically wound strips.

2. An electric cable comprising a plurality of conductors, a resilient insulation around each conductor, an impregnated fabric sheath around each resilient insulation, an impregnated fibrous wrapping around the fabric sheaths, a plurality of strips of stiff bendable non-magnetic, non-conducting material helically wound around the impregnated fibrous wrapping, and an impregnated fibrous wrapping around the helically wound strips.

3. An electric cable comprising a conductor, a resilient insulation around the conductor, an impregnated fabric sheath around the resilient insulation, a metallic sheath around the fabric sheath, an impregnated fibrous wrapping around the metallic sheath, a plurality of strips of stiff bendable non-metallic, non-conducting material helically wound around the impregnated fibrous wrapping, and an impregnated fibrous wrapping around the helically wound strips.

CARL P. BRODHUN.